United States Patent
Inoue et al.

(10) Patent No.: US 9,328,673 B2
(45) Date of Patent: May 3, 2016

(54) ENGINE

(71) Applicant: KUBOTA Corporation, Osaka-shi, Osaka (JP)

(72) Inventors: Hiroshi Inoue, Sakai (JP); Yutaka Teruumi, Sakai (JP); Kazuo Kojima, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 14/478,054

(22) Filed: Sep. 5, 2014

(65) Prior Publication Data

US 2015/0068500 A1 Mar. 12, 2015

(30) Foreign Application Priority Data

Sep. 9, 2013 (JP) ................................. 2013-185871

(51) Int. Cl.
| | |
|---|---|
| *F02M 21/02* | (2006.01) |
| *F02D 19/06* | (2006.01) |
| *F02M 21/04* | (2006.01) |
| *F02M 35/10* | (2006.01) |
| *F02B 43/00* | (2006.01) |
| *F02M 13/08* | (2006.01) |
| *F02D 19/08* | (2006.01) |

(52) U.S. Cl.
CPC ........ *F02D 19/0615* (2013.01); *F02D 19/0642* (2013.01); *F02M 21/0239* (2013.01); *F02M 21/047* (2013.01); *F02M 35/10177* (2013.01); *F02B 43/00* (2013.01); *F02D 19/06* (2013.01); *F02D 19/08* (2013.01); *F02M 13/08* (2013.01); *F02M 21/02* (2013.01)

(58) Field of Classification Search
CPC ........ F02M 13/08; F02M 21/02; F02B 43/00; F02D 19/06; F02D 19/08
USPC ......................................................... 123/525
See application file for complete search history.

(56) References Cited

U.S. PATENT DOCUMENTS

| | | | | |
|---|---|---|---|---|
| 6,026,787 | A  * | 2/2000 | Sun et al. ...................... | 123/525 |
| 2005/0279313 | A1* | 12/2005 | Boyes ....................... | 123/184.55 |
| 2010/0199954 | A1* | 8/2010 | Inoue et al. ................... | 123/521 |

FOREIGN PATENT DOCUMENTS

| | | |
|---|---|---|
| JP | 2010-203430 A | 9/2010 |
| JP | 2010-255621 A | 11/2010 |
| JP | 2011-214543 A | 10/2011 |

* cited by examiner

*Primary Examiner* — Lindsay Low
*Assistant Examiner* — Charles Brauch
(74) *Attorney, Agent, or Firm* — Panitch Schwarze Belisario & Nadel LLP

(57) ABSTRACT

It is an object of the present invention to provide an engine which can easily be produced. In an engine including an electronic throttle device, a control unit for controlling the electronic throttle device, and a gas fuel supply unit, a gaseous-fuel mixer is used as the gas fuel supply unit, and when an extending direction of a crankshaft is defined as a longitudinal direction and an engine cooling fan is defined as existing on a front side and a side opposite from the front side is defined as a rear side, a collector of an intake manifold extends in the longitudinal direction, the electronic throttle device is mounted on the rear side of the collector, and the gaseous-fuel mixer is mounted on the rear side of the electronic throttle device.

15 Claims, 9 Drawing Sheets

ENGINE

BACKGROUND OF THE INVENTION (1) Field of the invention

The present invention relates to an engine, and more particularly, to an engine which can easily be produced.

(2) Description of Related Art

There is a conventional engine including an electronic throttle device, a control unit for controlling the electronic throttle device, and a gaseous fuel supply unit (see Japanese Patent Application Laid-open No. 2011-214543 A, for example).

The engine of this kind has a merit that clean exhaust gas can be obtained by precisely adjusting an air intake amount by the electronic throttle device and by using gaseous fuel.

However, the engine according to Japanese Patent Application Laid-open No. 2011-214543 A has a problem because a gaseous fuel injector is used as the gaseous fuel supply unit and the gaseous fuel injector is oriented to an intake port.

BRIEF SUMMARY OF THE INVENTION

Problem

It becomes difficult to produce engines.

According to the engine of Japanese Patent Application Laid-open No. 2011-214543 A, the gaseous fuel injector is used as the gaseous fuel supply unit and the gaseous fuel injector is oriented to the intake port. Therefore, when parts of a liquid fuel-dedicated engine which uses only liquid fuel is diverted to produce an engine which uses gaseous fuel, an additional procedure is required for forming a mounting portion of the gaseous fuel injector on an intake manifold or a cylinder head of the liquid fuel-dedicated engine, and thus it becomes difficult to produce the engine.

It is an object of the present invention to provide an engine which can easily be produced.

As a result of research, the present inventors of the present invention have found that when a gaseous-fuel mixer is used as the gaseous fuel supply unit and the gaseous-fuel mixer is mounted behind the electronic throttle device located on the opposite side from an engine cooling fan, the gaseous-fuel mixer does not interfere with the engine cooling fan and the intake manifold and the cylinder head of the liquid fuel-dedicated engine can be diverted for an engine which uses gaseous fuel without additional procedure for forming the mounting portion of the gaseous fuel injector, and the inventors have thereby confirmed that production of engines becomes easy, whereby the present invention is achieved.

Means for Solving the Problem

A matter to define the invention is as follows.

In an engine including an electronic throttle device 1, a control unit 3 for controlling the electronic throttle device 1, and a gaseous fuel supply unit 4 as illustrated in FIG. 1, a gaseous-fuel mixer 8 is used as the gaseous fuel supply unit 4 as illustrated in FIG. 1 or 9, and when an extending direction of a crankshaft 9 is defined as a longitudinal direction and an engine cooling fan 10 is defined as existing on a front side and a side opposite from the front side is defined as a rear side, a collector 11a of an intake manifold 11 extends in the longitudinal direction, the electronic throttle device 1 is mounted on the rear side of the collector 11a, and the gaseous-fuel mixer 8 is mounted on the rear side of the electronic throttle device 1 as illustrated in FIG. 1.

Effect of the Invention

It becomes easy to produce engines.

The a gaseous-fuel mixer 8 is used as the gaseous fuel supply unit 4 as illustrated in FIG. 1 or 9 and the gaseous-fuel mixer 8 is mounted behind the electronic throttle device 1 located on the opposite side from the engine cooling fan 10 as illustrated in FIG. 1. Therefore, the gaseous-fuel mixer 8 does not interfere with the engine cooling fan 10 and the intake manifold 11 and a cylinder head 20 of the liquid fuel-dedicated engine can be diverted for an engine which uses gaseous fuel without additional procedure for forming the mounting portion of the gaseous fuel injector, and production of engines becomes easy.

As the engine which uses gaseous fuel, there are a dual fuel engine which uses gaseous fuel and liquid fuel in a switching manner, and a gaseous fuel-dedicated engine which uses only gaseous fuel.

It becomes easier to produce engines.

The gaseous-fuel mixer 8 includes a valve actuator 13 of a gaseous fuel valve 12 as illustrated in FIG. 1 or 9. Therefore, the valve actuator 13 of the gaseous fuel valve 12 can collectively be mounted behind the electronic throttle device 1 together with the gaseous-fuel mixer 8 as illustrated in FIG. 1, and it becomes easier to produce engines.

It becomes easier to produce engines.

The valve actuator 13 of the gaseous fuel valve 12 switches between only two positions, i.e., a fully opened position and a fully closed position of the gaseous fuel valve 12 as illustrated in FIG. 1 or 9. Therefore, control of the valve actuator 13 is simplified, and it is possible to omit or simplify a control program of the valve actuator 13 which is inputted to the control unit 3, and it becomes easier to produce engines.

It becomes easy to produce engines.

In the case where the engine is a dual fuel engine including a liquid fuel injector 2 placed downstream of the electronic throttle device 1 with respect to a suction direction, and a fuel supply switching operation unit 7 for switching fuel supply between liquid fuel 5 and gaseous fuel 6 as shown in FIG. 1, it is possible to divert the intake manifold 11 and the cylinder head 20 of the liquid fuel-dedicated engine for a dual fuel engine without additional procedure for forming a mounting portion of the gaseous fuel injector, and it becomes easy to produce engines.

It becomes easier to produce engines.

The gaseous-fuel mixer 8 includes a purge gas suction port 14 and a blow-by gas suction port 15 as illustrated in FIG. 1 or 9. Therefore, it is possible to collectively mount the purge gas suction port 14 and the blow-by gas suction port 15 behind the electronic throttle device 1 together with the gaseous-fuel mixer 8 as illustrated in FIG. 1, and it becomes easier to produce engines.

It is possible to stabilize rotation of the engine at the time of a switching operation of fuel supply.

As shown in FIG. 4, when a switching operation 18 of fuel supply from liquid fuel 5 to gaseous fuel 6 is carried out, supply of liquid fuel 5 is continued until the intake manifold 11 is filled with gaseous fuel 6 by delay time t1 to prevent shortage of fuel supply, and when a switching operation 19 of fuel supply from gaseous fuel 6 to liquid fuel 5 is carried out, supply of liquid fuel 5 is delayed until gaseous fuel 6 remaining in the intake manifold 11 is consumed to prevent overabundance of fuel supply, and it is possible to properly adjust the fuel supply amount, and to stabilize rotation of the engine at the time of the fuel supply switching operation.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3A is a front view of the engine as viewed from front, FIG. 3B is a side view of the engine as viewed from side, FIG. 3C is a back view of the engine as viewed from back, FIG. 3D is a plan view, FIG. 3E is a bottom view, FIG. 3F is a side view as viewed from a cylinder head cover, and FIG. 3G is a sectional view taken along line G-G in FIG. 3B;

DETAILED DESCRIPTION OF THE INVENTION

Figure 1:
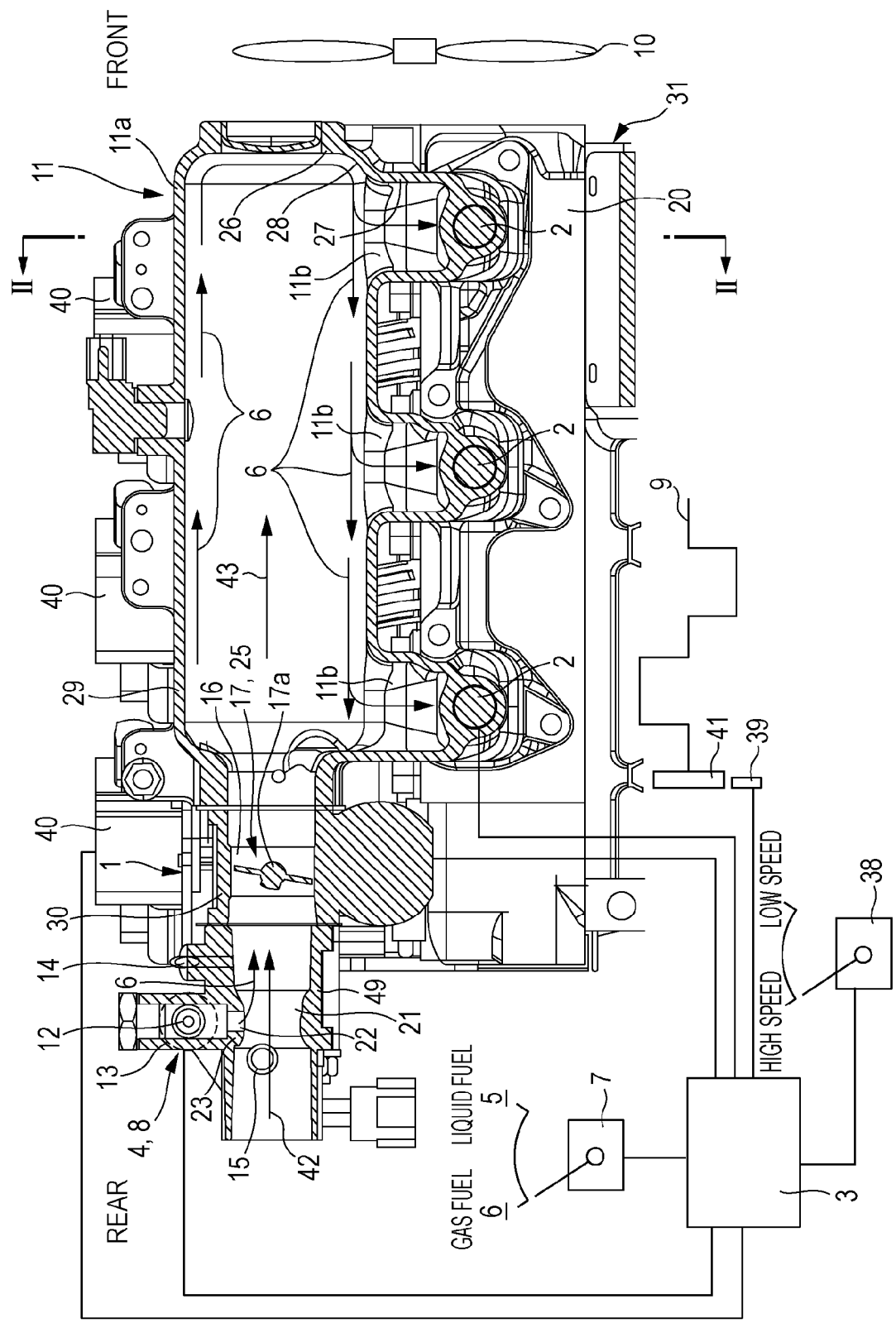
FIG. 1 is a partially vertical sectional side view of an upper portion of an engine according to an embodiment of the present invention in which an air suction path of the engine is cut vertically.

FIGS. 1 to 9 are diagrams for describing an engine according to an embodiment of the present invention. In this embodiment, a water-cooling vertical type straight three-cylinder dual fuel engine which uses gaseous fuel 6 and liquid fuel 5 while switching supply thereof will be described. The gaseous fuel 6 is LPG liquid petroleum gas, and the liquid fuel 5 is gasoline.

A general outline of this engine is as follows.

As shown in FIGS. 5 to 8, a cylinder head 20 is assembled into an upper portion of a cylinder block 31, a cylinder head cover 32 is assembled into an upper portion of the cylinder head 20, a timing power transmission case 34 is assembled into a front portion of the cylinder block 31, an engine cooling fan 10 is placed in front of the timing power transmission case 34, a flywheel 35 is placed behind the cylinder block 31, and an oil pan 36 is assembled into a lower portion of the cylinder block 31.

An intake manifold 11 is assembled into one of lateral sides of the cylinder head 20, and an exhaust manifold 37 is assembled into the other lateral side.

As shown in FIG. 1, this engine includes an electronic throttle device 1, a control unit 3 for controlling the electronic throttle device 1, and a gaseous fuel supply unit 4.

A gaseous-fuel mixer 8 is used as the gaseous fuel supply unit 4.

An extending direction of a crankshaft 9 is defined as a longitudinal direction, the engine cooling fan 10 is defined as being on a front side, and a side opposite from the front side is defined as a rear side. A collector 11a of the intake manifold 11 extends in the longitudinal direction, the electronic throttle device 1 is mounted on the rear side of the collector 11a, and the gaseous-fuel mixer 8 is mounted on the rear side of the electronic throttle device 1.

According to the above configuration, the gaseous-fuel mixer 8 does not interfere with the engine cooling fan 10, an intake manifold 11 and a cylinder head 20 of a liquid fuel-dedicated engine can be diverted for an engine which uses gaseous fuel without additional procedure for forming a mounting portion of a gaseous fuel injector, and it becomes easy to produce the engine.

As engines which use gaseous fuel, there are a dual fuel engine which uses gaseous fuel and liquid fuel while switching supply thereof and a gaseous fuel-dedicated engine which uses only gaseous fuel, but in this embodiment, the dual fuel engine is used.

As shown in FIG. 1, the gaseous-fuel mixer 8 includes a valve actuator 13 of a gaseous fuel valve 12.

Hence, it is possible to collectively mount the valve actuator 13 of the gaseous fuel valve 12 behind the electronic throttle device 1 together with the gaseous-fuel mixer 8 as shown in FIG. 1, and it becomes easier to produce the engine.

The valve actuator 13 of the gaseous fuel valve 12 shown in FIG. 1 switches between only two positions, i.e., a fully opened position and a fully closed position of the gaseous fuel valve 12.

Hence, control of the valve actuator 13 is simplified, it is possible to omit or simplify a control program of the valve actuator 13 which is input to the control unit 3, and it becomes easier to produce the engine.

As shown in FIG. 1, the dual fuel engine includes a liquid fuel injector 2 placed downstream of the electronic throttle device 1 with respect to the suction direction, and a fuel supply switching operation unit 7 which switches between the liquid fuel 5 and the gaseous fuel 6.

Hence, it is possible to divert the intake manifold 11 and the cylinder head 20 of the liquid fuel-dedicated engine for the dual fuel engine without additional procedure for forming a mounting portion of the gaseous fuel injector, and it becomes easy to produce the engine.

As shown in FIG. 1, the gaseous-fuel mixer 8 includes a purge gas suction port 14 and a blow-by gas suction port 15.

The liquid fuel 5 of a fuel tank (not shown) absorbed by an adsorbent of a canister is sucked by the gaseous-fuel mixer 8 from the purge gas suction port 14, and blow-by gas is sucked by the gaseous-fuel mixer 8 from the blow-by gas suction port 15.

Hence, it is possible to collectively mount the purge gas suction port 14 and the blow-by gas suction port 15 behind the electronic throttle device 1 together with the gaseous-fuel mixer 8 as shown in FIG. 1, and it becomes easier to produce the engine.

As shown in FIGS. 1, 3A, 3D and 3F, the blow-by gas suction port 15 is provided in a lateral side wall of a mixer body 49 upstream, with respect to the suction direction, of a gaseous fuel inlet 22 which faces a venturi passage 21 of the gaseous-fuel mixer 8 along a horizontal direction. The purge gas suction port 14 is provided in a ceiling wall of the mixer body 49 downstream of the gaseous fuel inlet 22 with respect to the suction direction such that the purge gas suction port 14 inclines downward as viewed from an upstream side with respect to the suction direction as shown in FIG. 3A.

As shown in FIG. 1, the fuel supply switching operation unit 7, the gaseous-fuel mixer 8 and the liquid fuel injector 2 are in liaison with the control unit 3.

Figure 4:
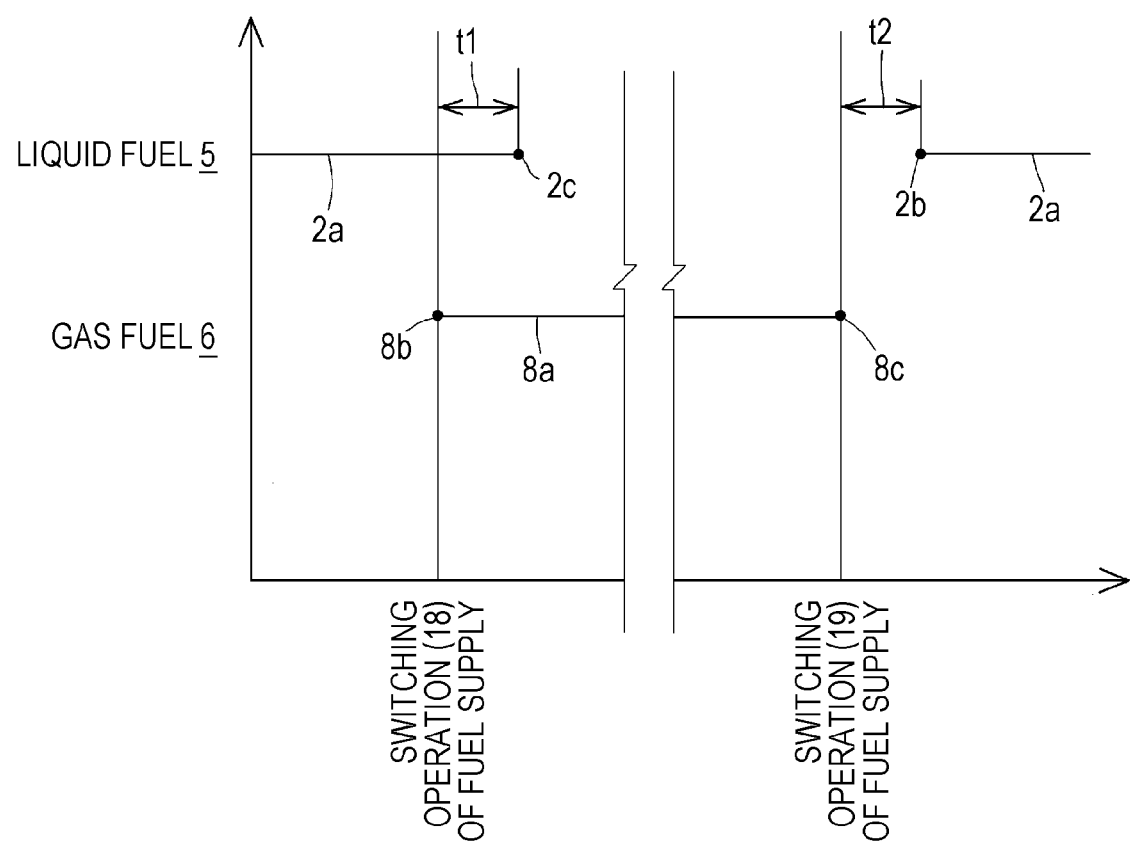
FIG. 4 is a diagram for describing control characteristics of a fuel supply period at the time of a switching operation of fuel supply of the engine shown in FIG. 1.
Figure 5:
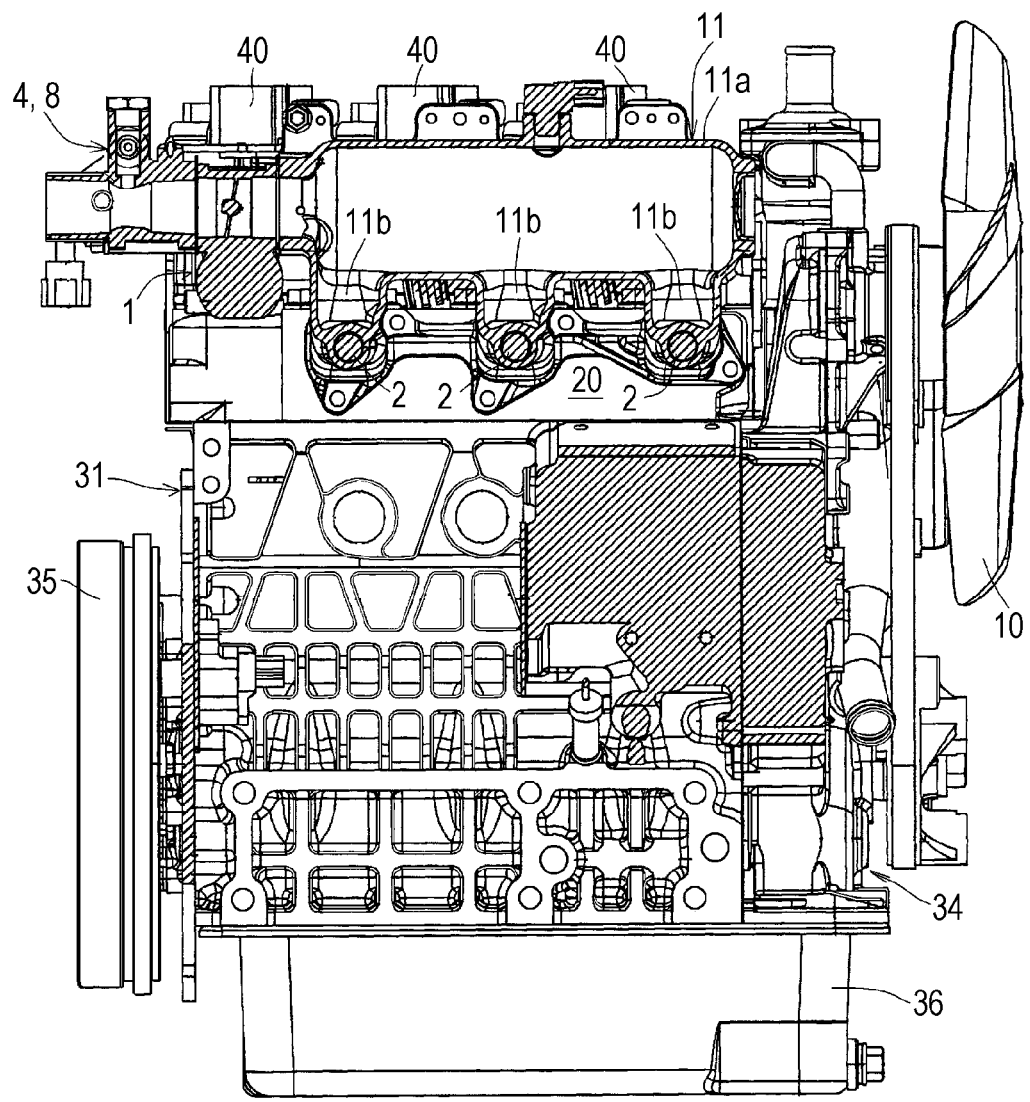
FIG. 5 is a partially vertical sectional side view of the engine shown in FIG. 1.
Figure 6:
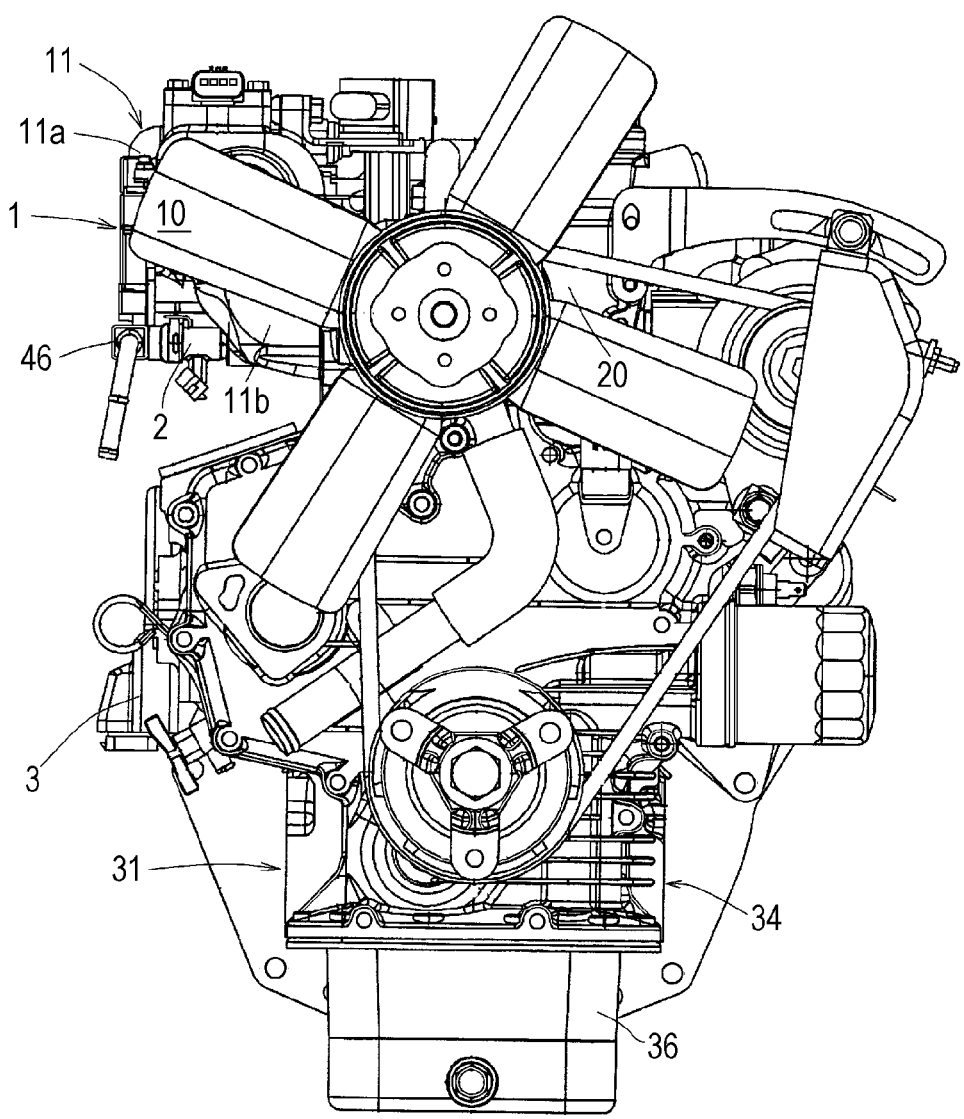
FIG. 6 is a front view of the engine shown in FIG. 1.
Figure 7:
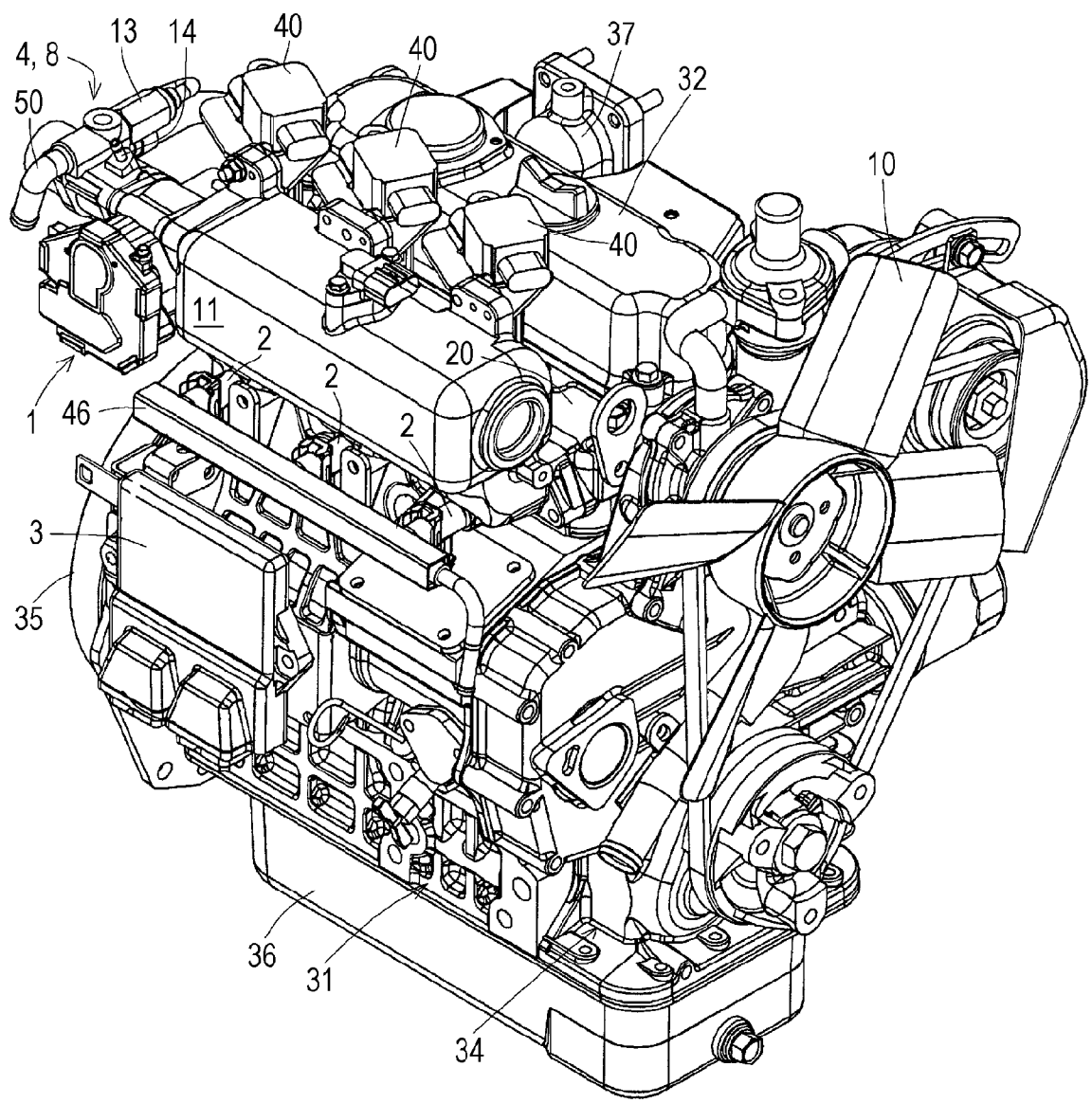
FIG. 7 is a top-down perspective view of the engine shown in FIG. 1 as viewed from a laterally front.
Figure 8:
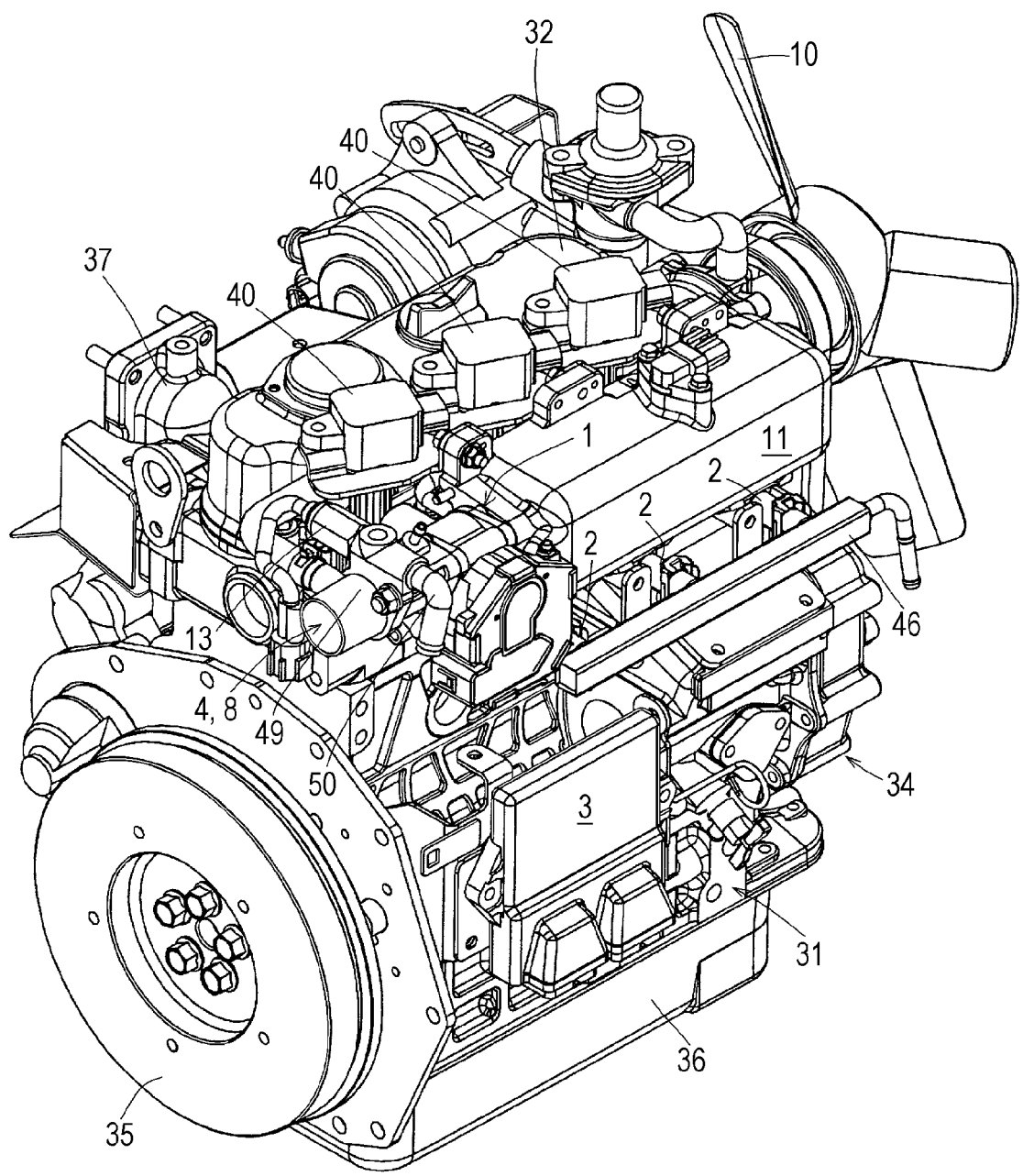
FIG. 8 is a top-down perspective view of the engine shown in FIG. 1 as viewed from a laterally back.

As shown in FIGS. 1 and 4, in the case where the fuel supply switching operation unit 7 carries out a switching operation 18 of fuel supply from liquid fuel 5 to gaseous fuel 6, a completion time point 2c of a liquid fuel supply period 2a of the liquid fuel injector 2 is delayed by the control unit 3 from a start time point 8b of a gaseous fuel supply period 8a of the gaseous-fuel mixer 8 by a predetermined delay time t1. In the case where the fuel supply switching operation unit 7 carries out the switching operation 19 of fuel supply from gaseous fuel 6 to liquid fuel 5, the start time point 2b of the liquid fuel supply period 2a of the liquid fuel injector 2 is delayed by the control unit 3 from the completion time point 8c of the gaseous fuel supply period 8a of the gaseous-fuel mixer 8 by a predetermined delay time t2.

As shown in FIG. 4, when the switching operation 18 of fuel supply from liquid fuel 5 to gaseous fuel 6 is carried out by the above-described configuration, supply of liquid fuel 5 is continued until the intake manifold 11 is filled with gaseous fuel 6 by the delay time t1 to prevent shortage of fuel supply, and when the switching operation 19 of fuel supply from gaseous fuel 6 to liquid fuel 5 is carried out, supply of liquid fuel 5 is delayed until gaseous fuel 6 remaining in the intake manifold 11 is consumed to prevent overabundance of fuel supply, and it is possible to properly adjust the fuel supply amount, and to stabilize rotation of the engine at the time of the fuel supply switching operation.

The control unit 3 is an engine ECU.

The engine ECU is abbreviation of an engine electronic control unit, and is a microcomputer.

As shown in FIG. 1, an air flow sensor (not shown), an oxygen sensor (not shown) and an electromagnetic pick up 39 which functions as the fuel supply switching operation unit 7, a target rotation number setting unit 38, an actual rotation number detecting unit and a crank angle detecting unit are in liaison with the electronic throttle device 1, the valve actuator 13 of the gaseous fuel valve 12, the liquid fuel injectors 2 and ignition coils 40 through the control unit 3.

The fuel supply switching operation unit 7 is a switching operation lever, and switching operation information of the switching operation lever is transmitted to the control unit 3 as a voltage signal.

The target rotation number setting unit 38 is a speed governing operation lever, and set position information of the speed governing operation lever is transmitted to the control unit 3 as a voltage signal of a potentiometer.

The electromagnetic pick up 39 is opposed to a large number of teeth provided on a peripheral surface of a rotor 41 mounted on the crankshaft 9, and the electromagnetic pick up 39 detects the actual rotation number and a crank angle by the number of teeth which pass in front of the electromagnetic pick up 39.

The air flow sensor detects an air intake amount of a suction passage. The oxygen sensor measures an oxygen amount in the emissions.

As the fuel supply switching operation unit 7, it is possible to use a switching operation button and a switching operation pedal in addition to the switching operation lever.

As the target rotation number setting unit 38, it is possible to use a speed governing operation button and a speed governing operation pedal in addition to the speed governing operation lever.

As shown in FIG. 1, when supply of gaseous fuel 6 is selected by the fuel supply switching operation unit 7, an opened state of the gaseous fuel valve 12 is maintained by the control unit 3, an opening degree of a throttle valve 17 is adjusted based on a rotation number deviation between the target rotation number and the actual rotation number, an oxygen amount in the emissions and an air intake amount, gaseous fuel 6 is sucked into the venturi passage 21 by negative pressure of suction air 42 generated in the venturi passage 21, air-fuel mixture 43 having a predetermined air-fuel ratio is supplied to each of the cylinders through the intake manifold 11, and each of the ignition coils 40 generates sparks by a spark plug (not shown) at predetermined ignition timing.

When supply of liquid fuel 5 is selected by the fuel supply switching operation unit 7, a closed state of the gaseous (vaporized) fuel valve 12 is maintained by the control unit 3, the opening degree of the throttle valve 17 is adjusted based on a rotation number deviation between target rotation speed and actual rotation speed, the oxygen amount in the emissions and the air intake amount, a predetermined amount of liquid fuel 5 is injected from the liquid fuel injector 2 at predetermined injection timing, and each of the ignition coils 40 generates sparks by the spark plug at predetermined ignition timing.

As shown in FIG. 1, the electronic throttle device 1 includes a throttle suction passage 16 and the throttle valve 17, the gaseous-fuel mixer 8 includes the venturi passage 21 and the gaseous fuel inlet 22 facing the venturi passage 21, the venturi passage 21 and the throttle suction passage 16 are connected to each other in series in the longitudinal direction, the gaseous fuel inlet 22 is downwardly provided in a ceiling wall 23 of the venturi passage 21, a butterfly valve 25 having a laterally extending throttle valve shaft 17a is used as the throttle valve 17, and a plurality of branch portions 11b of the intake manifold 11 are downwardly led out from a lower surface of the collector 11a.

A front end wall 26 of the collector 11a of the intake manifold 11 projects forward of a front end wall 27 of most front one of the branch portions 11b.

According to the above configuration, air-fuel ratios of the cylinder are equalized at the time of the supply operation of gaseous (vaporized) fuel.

A reason thereof is estimated as follows.

As shown in FIG. 1, the following structure is employed: the venturi passage 21 and the throttle suction passage 16 are connected to each other in series in the longitudinal direction, the gaseous fuel inlet 22 is downwardly provided in the ceiling wall 23 of the venturi passage 21, the butterfly valve 25 having the laterally extending throttle valve shaft 17a is used as the throttle valve 17, and the plurality of branch portions 11b of the intake manifold 11 are downwardly led out from the lower surface of the collector 11a. In the case of this structure, a portion of gaseous fuel 6 which flows from the gaseous fuel inlet 22 into the venturi passage 21 moves forward along a ceiling wall 30 of the throttle suction passage 16 and then, moves forward along a ceiling wall 29 of the collector 11a of the intake manifold 11 and then, moves downward along the front end wall 26 of the collector 11a.

In this case, if the front end wall 26 of the collector 11a of the intake manifold 11 is flush with the front end wall 27 of the most front branch portion 11b, gaseous fuel 6 which moves downward along the front end wall 26 of the collector 11a intensively flows into the most front branch portion 11b, and there is a tendency that an air-fuel ratio of that cylinder becomes excessively dense as compared with other cylinders. Especially when an opening degree of the butterfly valve 25 is small, gaseous fuel 6 is prone to be deviated by the ceiling wall 30 of the throttle suction passage 16 by the butterfly valve 25, and the above-described tendency is strong. In this embodiment, when the opening degree of the butterfly valve 25 is small no load is applied or light load is applied, butterfly valve 25 upwardly inclines toward a downstream side with respect to the suction direction, gaseous fuel 6 sucked out from the gaseous fuel inlet 22 is guided by an upper surface of the butterfly valve 25 and is deviated by the ceiling wall 30 of the throttle suction passage 16, and the above-described tendency is strong.

On the other hand, in this embodiment, since the front end wall 26 of the collector 11a of the intake manifold 11 projects forward of the front end wall 27 of the most front branch portion 11b, a front end lower corner 28 of the collector 11a which connects the front end wall 26 of the collector 11a of the intake manifold 11 and the front end wall 27 of the most front branch portion 11b is formed between the front end wall 26 and the front end wall 27, gaseous fuel 6 which moves downward along the front end wall 26 of the collector 11a is guided by the front end lower corner 28 of the collector 11a and the direction of the gaseous fuel 6 is changed rearward, the gaseous fuel 6 flows into the most front branch portion 11b and the other rear branch portions 11b, gaseous fuel 6 is distributed to the cylinders, and the air-fuel ratios of the cylinders are equalized.

As shown in FIG. 1, an inner surface of the front end lower corner 28 of the collector 11a which connects the front end wall 26 of the collector 11a of the intake manifold 11 and the front end wall 27 of the most front branch portion 11b is formed into a curved shape whose tangent gradually approaches a horizontal attitude as approaching the front end wall 27 of the most front branch portion 11b from the front end wall 26 of the collector 11a as viewed from side.

The air-fuel ratios of the cylinders are further equalized at the time of the supply operation of gaseous fuel.

A reason thereof is estimated as follows.

The direction of gaseous fuel 6 which moves downward along the front end wall 26 of the collector 11a is smoothly changed rearward along the curved shape of the inner surface of the front end lower corner 28 of the collector 11a, and turbulence flow is less prone to be generated. Therefore, gaseous fuel 6 does not stay still around the most front branch portion 11b, a flow of gaseous fuel 6 is smoothly changed rearward, gaseous fuel 6 is distributed also to other cylinders, and the air-fuel ratios of the cylinders are further equalized.

According to the gaseous-fuel mixer 8 shown in FIG. 1, the gaseous fuel inlet 22 is constituted by a hole which opens at the ceiling wall 23 of the venturi passage 21, and the gaseous-fuel mixer 8 does not include a gaseous fuel nozzle which projects into the venturi passage 21.

Hence, a cross sectional area of the passage of the venturi passage 21 is large, suction resistance is small, more suction air 42 can be introduced and high output can be obtained.

Figure 9:
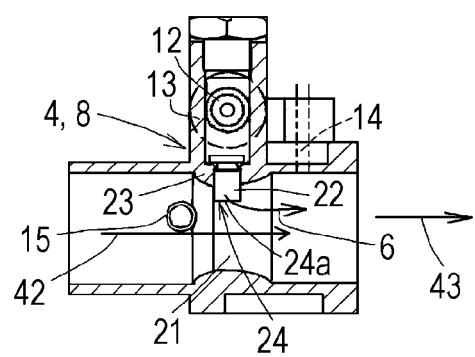
FIG. 9 is a vertical sectional side view of a modification of the gaseous-fuel mixer of the engine shown in FIG. 1.

FIG. 9 shows a modification of the gaseous-fuel mixer 8. The gaseous fuel inlet 22 is formed of a gaseous fuel nozzle 24 which is added to the ceiling wall 23 of the venturi passage 21, and a lower end 24a of the gaseous fuel nozzle 24 projects into the venturi passage 21. Other configurations and functions are the same as those of the gaseous-fuel mixer 8 of the basic example shown in FIG. 1. In FIG. 9, the same reference signs are allocated to the same elements as those shown in FIG. 1.

According to the above configuration, the air-fuel ratios of the cylinders are further equalized at the time of the supply operation of gaseous fuel.

A reason thereof is estimated as follows.

With reference to FIG. 1, gaseous fuel 6 from the gaseous fuel nozzle 24 flows out to a location close to a center of the venturi passage 21, gaseous fuel 6 existing along the ceiling wall 30 of the throttle suction passage 16 and the ceiling wall 29 of the collector 11a of the intake manifold 11 is reduced, gaseous fuel 6 existing close to a center of the collector 11a is increased, and before the gaseous fuel 6 reaches the front end wall 26 of the collector 11a, the gaseous fuel 6 is swiftly mixed with suction air 42. Therefore, the air-fuel ratios of the cylinders are further equalized.

Figure 2:
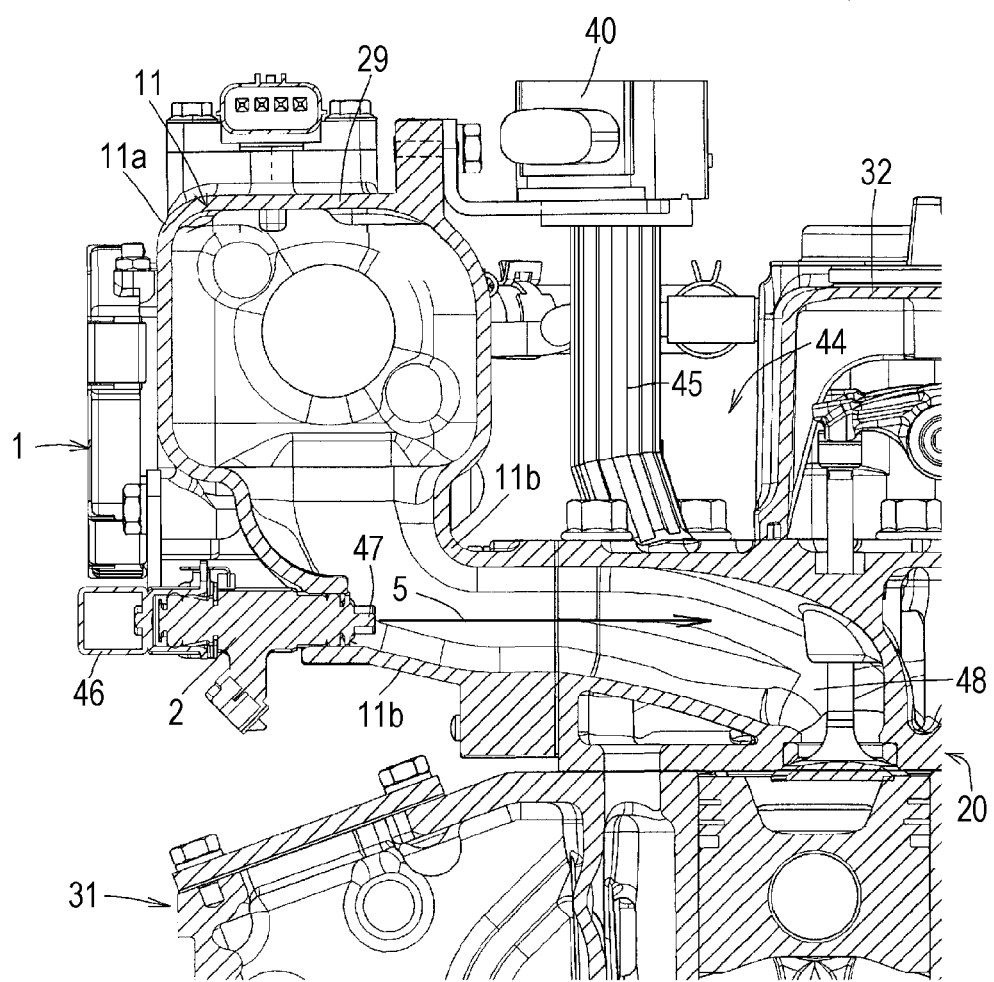
FIG. 2 is a sectional view taken along line II-II in FIG. 1.
Figure 3:
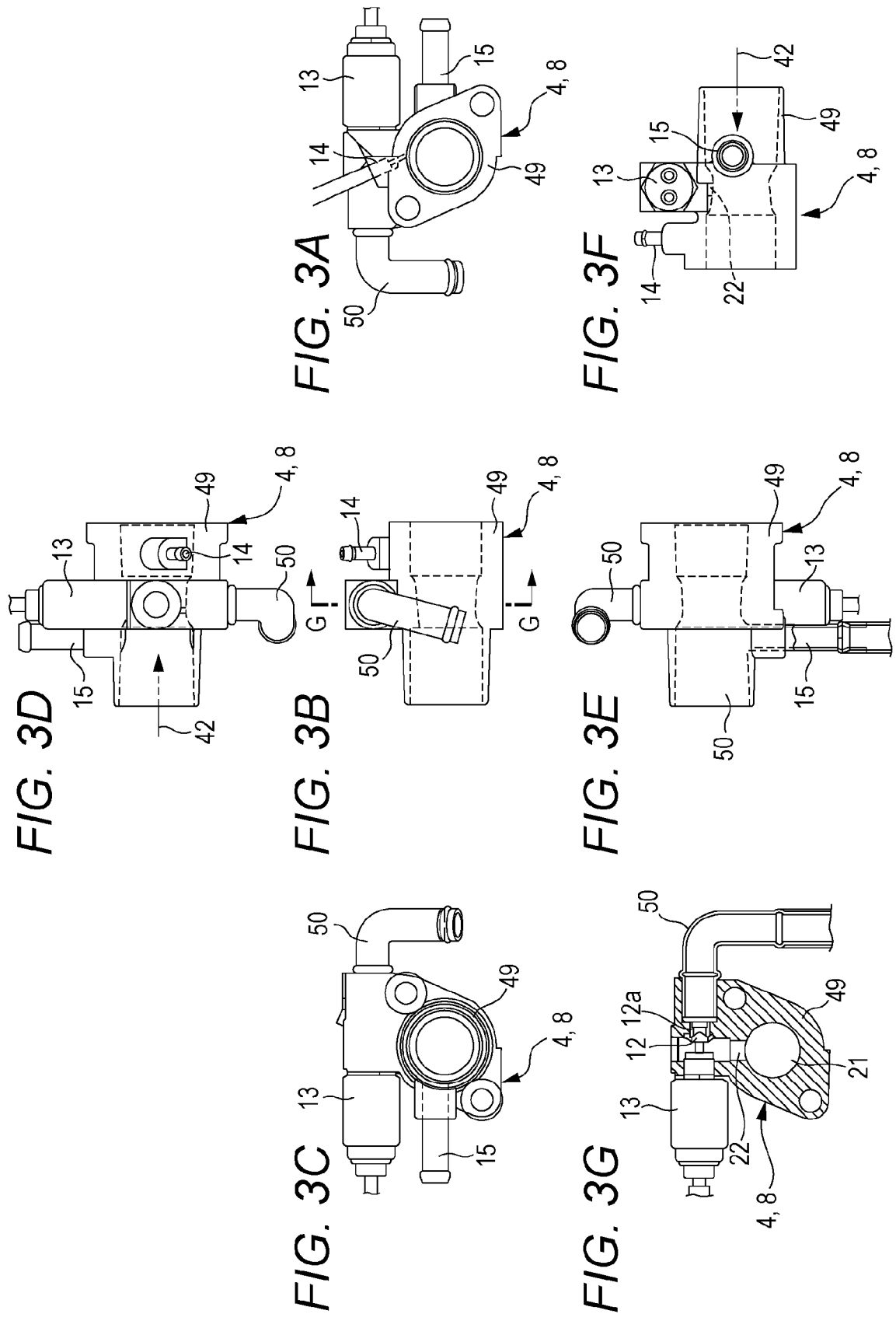
FIGS. 3A to 3G are diagrams for describing a gaseous-fuel mixer used in the engine shown in FIG. 1.

The collector 11a of the intake manifold 11 is of a rectangular box shape as shown in FIG. 2 and has a surge tank function, a plug cap accommodating space 44 is provided between the intake manifold 11 and the cylinder head cover 32, and a plug cap 45 which is integral with the ignition coil 40 is accommodated in the plug cap accommodating space 44. A fuel delivery pipe 46 is mounted on the intake manifold 11 on its side opposite from the plug cap, the liquid fuel injectors 2 are mounted on the fuel delivery pipe, the liquid fuel injectors 2 are inserted into the branch portions 11b of the intake manifold 11, and nozzles 47 of the liquid fuel injectors 2 are oriented to an intake port 48.

As shown in FIGS. 3A to 3G, the gaseous fuel valve 12, the valve actuator 13 of the gaseous fuel valve 12, the purge gas suction port 14 and the blow-by gas suction port 15 are integrally assembled into the mixer body 49 of the gaseous-fuel mixer 8. The gaseous fuel valve 12 sits on a valve seat 12a provided on a terminal end of a gaseous fuel supply passage 50.

The valve actuator 13 of the gaseous fuel valve 12 can be adjusted not only between the two positions, i.e., the fully opened position and the fully closed position, but also can be configured such that an opening degree of the gaseous fuel valve 12 can freely be adjusted to any positions between the fully opened position and the fully closed position.

In this case, by adjusting both the opening degree of the throttle valve 17 of the electronic throttle device 1 and the opening degree of the gaseous fuel valve 12 by the control unit 3, it is possible to adjust a supply amount of gaseous fuel 6 and the air-fuel ratio of the air-fuel mixture 43 with a high degree of accuracy.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An engine comprising,
   an electronic throttle device including a throttle suction passage and a butterfly throttle valve having a laterally extending throttle valve shaft,
   a control unit for controlling the electronic throttle device,
   a gaseous fuel supply unit,
   a gaseous-fuel mixer is used as the gaseous fuel supply unit, including a venturi passage and a gaseous fuel inlet facing the venturi passage,
   a crankshaft defining a longitudinal direction in an extending direction thereof,
   an engine cooling fan positioned on a front side of the engine in the longitudinal direction and a side opposite from the front side being a rear side, and
   a collector of an intake manifold extending in the longitudinal direction, wherein
      the electronic throttle device is mounted rearwardly of the collector,
      the gaseous-fuel mixer is mounted rearwardly of the electronic throttle device, the venturi passage and the throttle suction passage are connected to each other in series in the longitudinal direction, the gaseous fuel inlet is downwardly provided in a ceiling wall of the venturi passage, a plurality of branch portions of the intake manifold are downwardly led out from a lower surface of the collector, a front end wall of the collector projects forward of a front end wall of a front-most one of the branch portions, and an inner surface of a front end lower corner of the collector, connecting the front end wall of the collector and the front end wall of the front-most branch portion is curvedly shaped, a tangent of said curved shape gradually approaching horizontal as the curved shape approaches the front end wall of the front-most branch portion from the front end wall of the collector.

2. The engine according to claim 1, wherein the gaseous-fuel mixer further includes a valve actuator of a gaseous fuel valve.

3. The engine according to claim 2, wherein the valve actuator of the gaseous fuel valve switches only between a fully opened position and a fully closed position of the gaseous fuel valve.

4. The engine according to claim 1, wherein the engine is a dual fuel engine further including a liquid fuel injector placed downstream of the electronic throttle device with respect to a suction direction, and a fuel supply switching operation unit for switching fuel supply between liquid fuel and gaseous fuel.

5. The engine according to claim 4, wherein the gaseous-fuel mixer further includes a purge gas suction port and a blow-by gas suction port, and wherein liquid fuel in a fuel tank absorbed by an adsorbent of a canister is sucked from the purge gas suction port into the gaseous-fuel mixer, and blow-by gas is sucked from the blow-by gas suction port into the gaseous-fuel mixer.

6. The engine according to claim 4, wherein the fuel supply switching operation unit, the gaseous-fuel mixer and the liquid fuel injector are in liaison with the control unit, and when a switching operation of fuel supply from liquid fuel to gaseous fuel is carried out by the fuel supply switching operation unit, a completion time point of a liquid fuel supply period of the liquid fuel injector is delayed by the control unit from a start time point of a gaseous fuel supply period of the gaseous-fuel mixer by a predetermined delay time, and when a switching operation of fuel supply from gaseous fuel to liquid fuel is carried out by the fuel supply switching operation unit, a start time point of the liquid fuel supply period of the liquid fuel injector is delayed by the control unit from a completion time point of the gaseous fuel supply period of the gaseous-fuel mixer by a predetermined delay time.

7. The engine according to claim 2, wherein the engine is a dual fuel engine further including a liquid fuel injector placed downstream of the electronic throttle device with respect to a suction direction, and a fuel supply switching operation unit for switching fuel supply between liquid fuel and gaseous fuel.

8. The engine according to claim 7, wherein the gaseous-fuel mixer further includes a purge gas suction port and a blow-by gas suction port, and wherein liquid fuel in a fuel tank absorbed by an adsorbent of a canister is sucked from the purge gas suction port into the gas-fuel mixer, and blow-by gas is sucked from the blow-by gas suction port into the gas-fuel mixer.

9. The engine according to claim 7, wherein the fuel supply switching operation unit, the gaseous-fuel mixer and the liquid fuel injector are in liaison with the control unit, and when a switching operation of fuel supply from liquid fuel to gaseous fuel is carried out by the fuel supply switching operation unit, a completion time point of a liquid fuel supply period of the liquid fuel injector is delayed by the control unit from a start time point of a gaseous fuel supply period of the gaseous-fuel mixer by a predetermined delay time, and when a switching operation of fuel supply from gaseous fuel to liquid fuel is carried out by the fuel supply switching operation unit, a start time point of the liquid fuel supply period of the liquid fuel injector is delayed by the control unit from a completion time point of the gaseous fuel supply period of the gaseous-fuel mixer by a predetermined delay time.

10. The engine according to claim 3, wherein the engine is a dual fuel engine further including a liquid fuel injector placed downstream of the electronic throttle device with respect to a suction direction, and a fuel supply switching operation unit for switching fuel supply between liquid fuel and gaseous fuel.

11. The engine according to claim 10, wherein the gaseous-fuel mixer further includes a purge gas suction port and a blow-by gas suction port, and wherein liquid fuel in a fuel tank absorbed by an adsorbent of a canister is sucked from the purge gas suction port into the gas-fuel mixer, and blow-by gas is sucked from the blow-by gas suction port into the gas-fuel mixer.

12. The engine according to claim 10, wherein the fuel supply switching operation unit, the gaseous-fuel mixer and the liquid fuel injector are in liaison with the control unit, and when a switching operation of fuel supply from liquid fuel to gaseous fuel is carried out by the fuel supply switching operation unit, a completion time point of a liquid fuel supply period of the liquid fuel injector is delayed by the control unit from a start time point of a gaseous fuel supply period of the gaseous-fuel mixer by a predetermined delay time, and when a switching operation of fuel supply from gaseous fuel to liquid fuel is carried out by the fuel supply switching operation unit, a start time point of the liquid fuel supply period of the liquid fuel injector is delayed by the control unit from a completion time point of the gaseous fuel supply period of the gaseous-fuel mixer by a predetermined delay time.

13. The engine according to claim 5, wherein the fuel supply switching operation unit, the gaseous-fuel mixer and the liquid fuel injector are in liaison with the control unit, and when a switching operation of fuel supply from liquid fuel to gaseous fuel is carried out by the fuel supply switching operation unit, a completion time point of a liquid fuel supply period of the liquid fuel injector is delayed by the control unit from a start time point of a gaseous fuel supply period of the gaseous-fuel mixer by a predetermined delay time, and when a switching operation of fuel supply from gaseous fuel to liquid fuel is carried out by the fuel supply switching operation unit, a start time point of the liquid fuel supply period of the liquid fuel injector is delayed by the control unit from a completion time point of the gaseous fuel supply period of the gaseous-fuel mixer by a predetermined delay time.

14. The engine according to claim 8, wherein the fuel supply switching operation unit, the gaseous-fuel mixer and the liquid fuel injector are in liaison with the control unit, and when a switching operation of fuel supply from liquid fuel to gaseous fuel is carried out by the fuel supply switching operation unit, a completion time point of a liquid fuel supply period of the liquid fuel injector is delayed by the control unit from a start time point of a gaseous fuel supply period of the gaseous-fuel mixer by a predetermined delay time, and when a switching operation of fuel supply from gaseous fuel to liquid fuel is carried out by the fuel supply switching operation unit, a start time point of the liquid fuel supply period of the liquid fuel injector is delayed by the control unit from a completion time point of the gaseous fuel supply period of the gaseous-fuel mixer by a predetermined delay time.

15. The engine according to claim 11, wherein the fuel supply switching operation unit, the gaseous-fuel mixer and the liquid fuel injector are in liaison with the control unit, and when a switching operation of fuel supply from liquid fuel to gaseous fuel is carried out by the fuel supply switching operation unit, a completion time point of a liquid fuel supply period of the liquid fuel injector is delayed by the control unit from a start time point of a gaseous fuel supply period of the gaseous-fuel mixer by a predetermined delay time, and when a switching operation of fuel supply from gaseous fuel to liquid fuel is carried out by the fuel supply switching operation unit, a start time point of the liquid fuel supply period of the liquid fuel injector is delayed by the control unit from a completion time point of the gaseous fuel supply period of the gaseous-fuel mixer by a predetermined delay time.

* * * * *